(12) United States Patent
Göd

(10) Patent No.: US 6,769,918 B1
(45) Date of Patent: Aug. 3, 2004

(54) TUTORIAL SYSTEM FOR LEARNING TRAINING CONTENTS, LEARNING PROGRAMME LOGIC

(76) Inventor: Heinz Göd, Vorklostergasse 45, A-6900 Bregenz (AT)

(*) Notice: Subject to any disclaimer, the term of this patent is extended or adjusted under 35 U.S.C. 154(b) by 0 days.

(21) Appl. No.: 09/463,601
(22) PCT Filed: Jun. 22, 1998
(86) PCT No.: PCT/AT98/00155
§ 371 (c)(1), (2), (4) Date: Jan. 28, 2000
(87) PCT Pub. No.: WO99/06982
PCT Pub. Date: Feb. 11, 1999

(30) Foreign Application Priority Data

Jul. 31, 1997 (AT) .............................................. 1299/97
Apr. 17, 1998 (AT) .............................................. 251/98

(51) Int. Cl.[7] .................................................. G09B 11/00
(52) U.S. Cl. .................................. 434/365; 434/307 R
(58) Field of Search ................................ 434/322, 323, 434/350, 362, 365, 307 A, 343, 419, 307 R

(56) References Cited

U.S. PATENT DOCUMENTS

| | | | |
|---|---|---|---|
| 5,017,143 A | | 5/1991 | Backus et al. |
| 5,134,484 A | * | 7/1992 | Willson ........................ 348/564 |
| 5,147,205 A | | 9/1992 | Gross et al. |
| 5,169,319 A | | 12/1992 | Potocki |
| 5,377,997 A | | 1/1995 | Wilden et al. |
| 5,572,260 A | | 11/1996 | Onishi et al. |
| 5,613,909 A | | 3/1997 | Stelovsky |
| 5,644,363 A | * | 7/1997 | Mead ........................ 348/473 |
| 5,736,986 A | * | 4/1998 | Sever, Jr. ..................... 345/419 |
| 5,738,527 A | * | 4/1998 | Lundberg .................... 434/322 |
| 5,743,743 A | * | 4/1998 | Ho et al. ..................... 434/236 |
| 5,743,746 A | * | 4/1998 | Ho et al. ..................... 434/332 |
| 5,827,071 A | * | 10/1998 | Sorensen et al. ........... 434/323 |
| 6,057,846 A | * | 5/2000 | Sever, Jr. ..................... 345/419 |

FOREIGN PATENT DOCUMENTS

| | | |
|---|---|---|
| WO | 93/02622 | 2/1993 |
| WO | 94/26063 | 11/1994 |
| WO | 96/16388 | 5/1996 |

* cited by examiner

Primary Examiner—Teresa Walberg
Assistant Examiner—Kathleen Christman
(74) Attorney, Agent, or Firm—Wenderoth, Lind & Ponack, L.L.P.

(57) ABSTRACT

A learning system and method for visually displaying learning contents stored on a memory onto a display for facilitating easy learning by humans. The learning system and method being capable of causing a visual presentation to be displayed on a display screen for a predetermined period of time such as less than 0.2 second. The learning contents can be introduced at changing locations in a region of the visual presentation on the display screen. The visual presentation include, for example, a computer game, a television film, or a video game being displayed on the display screen.

12 Claims, 5 Drawing Sheets

TUTORIAL SYSTEM FOR LEARNING TRAINING CONTENTS, LEARNING PROGRAMME LOGIC

TECHNICAL FIELD OF THE INVENTION

The invention concerns a learning system for learning learning contents. The invention further concerns a method of learning learning contents and a program logic of a learning program.

BACKGROUND OF THE INVENTION

A learning system in which learning contents are displayed on a display screen is known for example from U.S. Pat. No. 5,147,205.

The principle applies to any type of learning that a human being normally learns easily and something which the human finds to be really interesting. However, if something does not interest the human being, then he learns it only reluctantly, generally very slowly, only in such a manner that he does not really know it well, and also so that the human quickly forgets it again. Nowadays, in regard to learning in a school context, there are some activities such as, for example, spelling exercises, learning vocabulary, learning dates in history or learning formulae in chemistry, which many people do not like, which they find tedious, and for which it is therefore probably difficult to arouse interest on the part of such people.

SUMMARY OF THE INVENTION

The object of the invention is to provide a learning system, a method of learning, and a program logic of a learning system, whereby the learning of learning contents which arouse little interest is made easier.

The present invention is based on the realization that the brain of a human being, if he looks at something which is of interest to him, is opened up for the receipt of items of information. If at the same time something which is not interesting to him is also brought into play, that also penetrates well into the brain which is switched into a receiving mode, and it is therefore learned more easily.

Desirably, the learning contents are played into or introduced into the visual presentation in small portions, wherein the individual introductions are effected at spacings from each other with respect to time and the introduction time of a learning content is substantially shorter than the time interval between two successive introductions of learning contents. For example, the introduction of the learning content can be into a computer game. For that purpose, the learning content is called up out of a learning material memory and the game program is briefly interrupted for introducing the learning content. After the interruption, the game program is resumed until the next learning content is introduced. In that situation, because of the short length of the introductions of learning contents which can possibly be below the perception threshold, the interruptions in the game program are so short that playing of the game is not adversely affected. In that case, the learning content can be presented only during the interruption in the game or also while the game is continuing, if the game permits that.

DESCRIPTION OF THE DRAWINGS

Further advantages and details of the invention are described hereinafter with reference to the accompanying drawing in which.

DETAILED DESCRIPTION OF THE INVENTION

Figure 1:
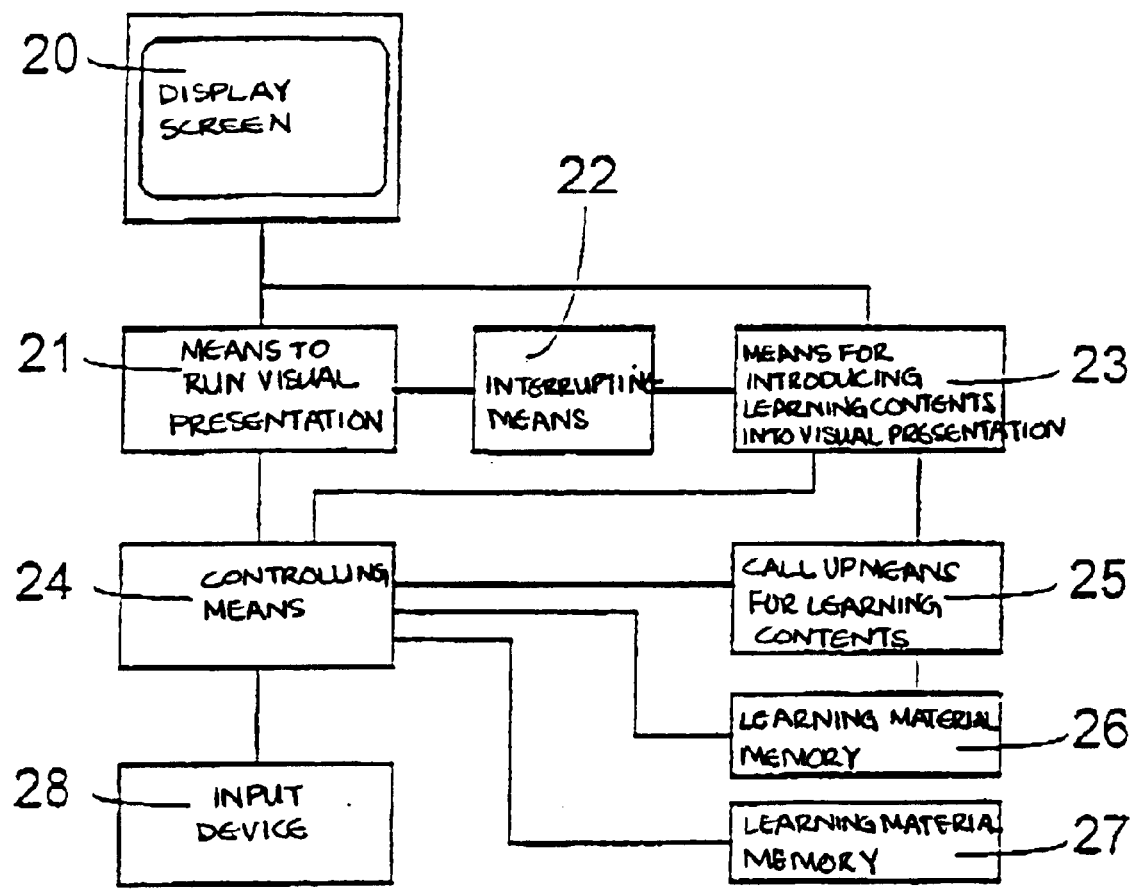
FIG. 1 is a diagrammatic view of a learning system according to the invention.

Referring to FIG. 1, diagrammatically illustrated therein is a learning system according to the invention having a means/device 21 which causes a visual presentation such as a computer game, a television film or a video game to run on a display screen 20. The visual presentation can be influenced by way of an input device 28 which, besides a keyboard can also include a mouse and a joystick, and by way of a means/device 24 for controlling the learning system. In that way, it is possible, for example, to select which visual presentation is to run, and given presetting values in respect of the visual presentation can be inputted. If the nature of the visual presentation permits it, the running of the presentation can also be interactively influenced.

The learning contents to be learned are stored in a learning material memory 26 and are called up out of the same by a means/device 25. Those called-up learning contents are played into or introduced into the visual presentation running on the display screen 20 by a means/device 23. Preferably, while a learning content is being played on the display screen 20, running of the visual presentation is interrupted by a means/device 22. Various modes of displaying the learning contents in a region of the visual presentation are described hereinafter with reference to FIG. 2.

The learning system can be controlled in various ways via the input device 28 and the means/device 24. It is possible to alter the intervals between the individual introductions of a learning content by the means/device 23 and the duration of the display of a learning content on the display screen 20. It is possible to input which of the learning contents are called up out of the learning material memory by the means/device 25, and at what frequency. The learning contents in the learning material memory 26 can be processed and further learning contents can be introduced into the learning material memory 26 from a further memory 27 such as, for example, a hard disk drive or an interchangeable data carrier drive. The learning contents can also be called up from the learning material memory 26 in order to check the learning success.

Figure 2:
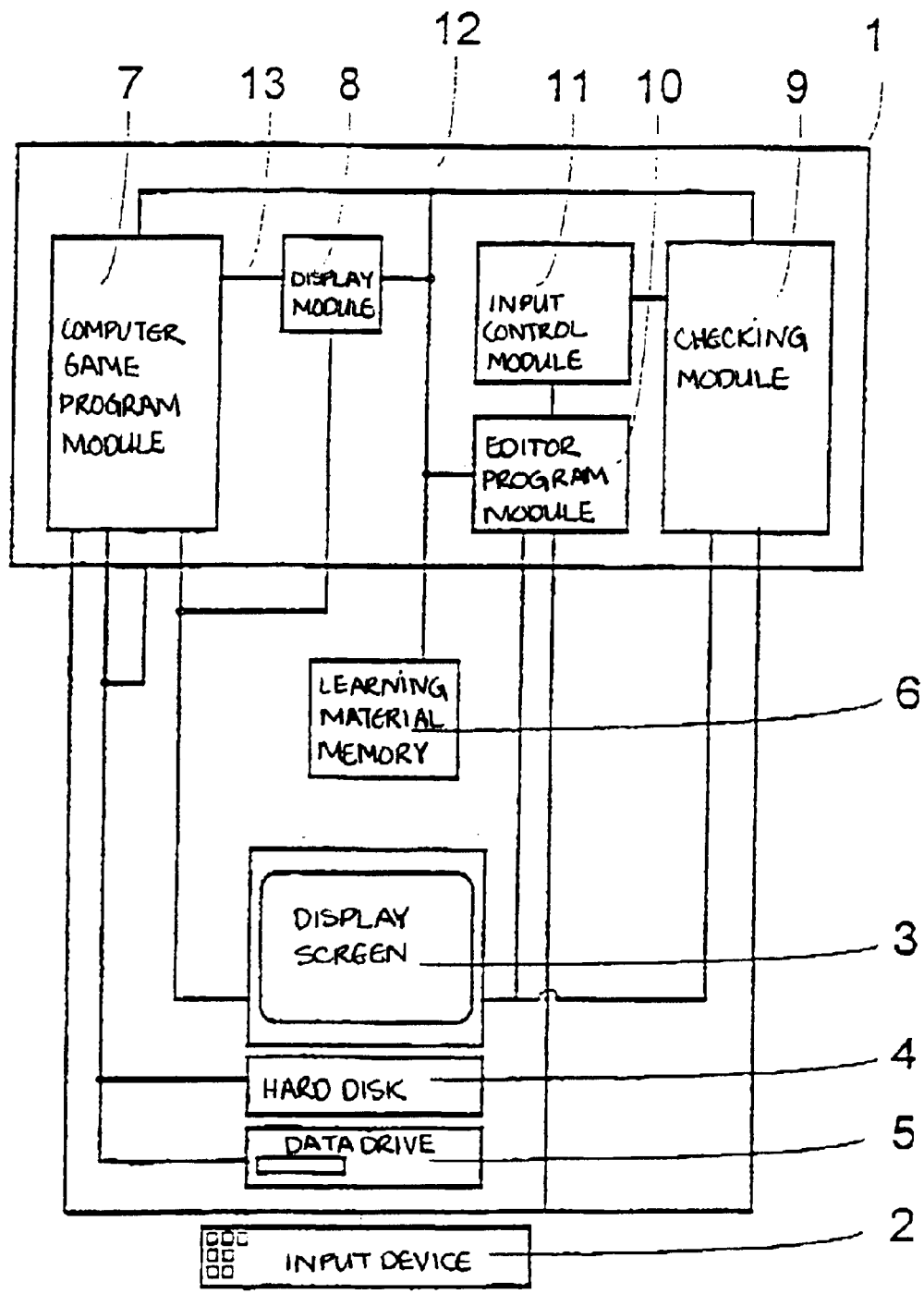
FIG. 2 is a further diagrammatic view of a learning system according to the invention, showing a learning program which is subdivided into various modules.

The learning system diagrammatically illustrated in FIG. 2 shows a learning program 1 which runs on a commercially available PC and communicates with various hardware components of the PC. A plurality of such hardware components which are of importance for the learning system are shown in FIG. 2. They are an input device 2 in the form of a keyboard and/or mouse, a display screen 3, a permanent memory in the form of a hard disk drive 4, a further drive 5 for interchangeable media such as floppy disks or CD-ROMs. A learning material memory 6 is disposed in the main memory of the computer, while a part of that learning material memory can be taken out of and stored onto the hard disk drive 4 or the data carrier fitted into the further drive 5.

The learning program 1 includes a computer game program module 7, a learning content display module 8, a checking module 9, an editor program module 10, an input control module 11 and a control program 12 into which the specified program modules are embedded and which provides a graphic user interface on the display screen 3 for the input of parameters and for selection of one of the various program procedures.

The computer game program module 7 causes a computer game (which can be selected from a number of computer games) to run as a visual presentation on the display screen 3. The computer game can be operated by way of the input device 2. At given intervals which can be set by way of the graphic user interface of the control program, the learning content display module 8 or the control program 12 interrupts the running of the computer game by the computer game program module 7 and the learning content display module 8 introduces a learning content which is loaded from the learning material memory 6 into the visual presentation which is shown on the display screen (and which is momentarily stopped). The learning content introduction period can be selected by way of the graphic user interface of the control program 12 and is preferably in a range which is shorter than 1 second and which is preferably shorter than 0.2 second and, if desired, can even be shorter than the conscious perception threshold for the learning content. After the learning content introduction period has expired, the computer game program module 7 resumes the computer game until the next interruption takes place for the purposes of introducing a portion of learning content. The time interval between two successive operations of introducing learning contents can in turn be selected by way of the graphic user interface of the control program 12 and is preferably substantially longer than the introduction period of an individual portion of learning content in order to present an adverse effect on a running of the computer game, in order to prevent the computer game from being robbed of its character as a game, and in order to permit psychological processing of the individual learning contents by the user. In the case of game programs which are suitable for that purpose, the displayed learning content can also still persist in the game as it continues.

Introduction of the learning content into the visual presentation displayed on the display screen can be implemented into a stationary area which is always at the same location or which appears at respective various positions which are adapted to what is happening on the display screen, or into a moving area which follows a given event of the computer game. For that purpose, the computer game program module can be briefly interrupted and caused to run again a plurality of times in succession by the learning content display module 8, in which case upon each interruption in the computer game program module by the learning content display module, the area for display of the leaning content is displayed at a somewhat displaced location on the display screen so that the overall impression afforded is that of a moving area. The area can be visible due to a frame and a filling color and, in that case, can be steady, blinking, or invisible (the nature thereof can be selected by the user). The learning content itself can be displayed in the area continuously (steadily) or in a blinking-or flashing mode, in which respect "blinking" means repeated brief display and "flashing" means single very brief display. The flashing time of the learning content can be so short that it is beneath the perception threshold. The learning content can also be introduced in a pixel-wise or a letter-wise manner. The appearance of the introduced learning contents can be graphically configured by the user with the editor program module 10.

For the purposes of learning a foreign language, the learning contents are one or more words of that foreign language and they are introduced in the form of labelling on, or inscriptions applied to, objects present in the computer game. In order to achieve interactivity, those leaning contents can also be displayed when the respective objects are clicked with the mouse pointer. In the case of learning systems of that kind, in the simplest embodiment, there is no need either for a specific learning material memory or an interruption in the game, because labelling and also display when clicking on objects can be parts of the game. If the necessary hardware is present, the learning contents can also be introduced acoustically in the form of speech.

Figure 3:
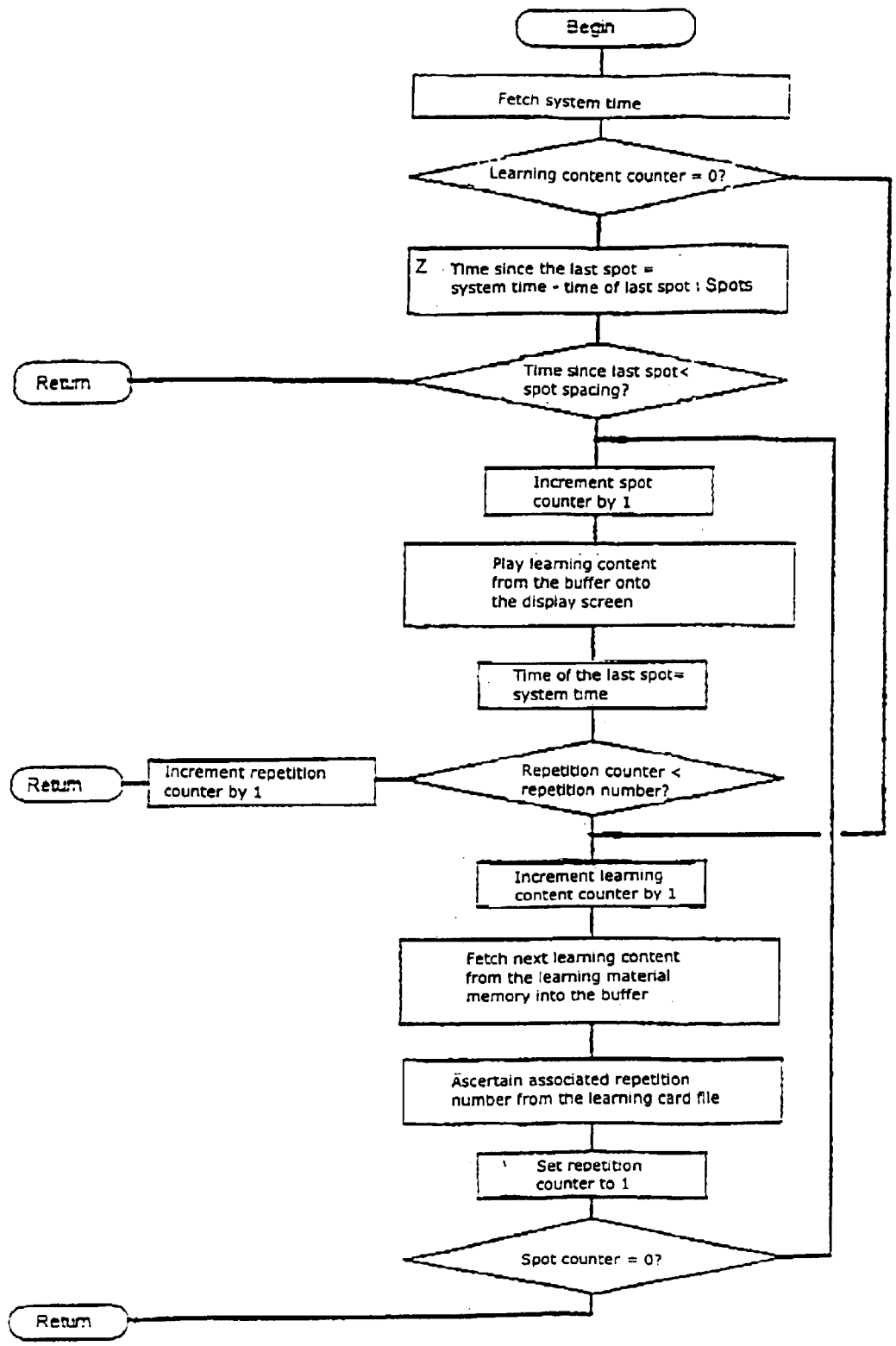
FIG. 3 shows a flow chart of a learning content display module.

FIG. 3 shows a flow chart of an embodiment of a learning content display module, and more specifically, shows a variant when the computer system used and the computer language employed do not permit time sharing. After the beginning of the program, the system time is loaded. In the first running of the program after the beginning of a new learning session, the learning content counter is set to zero and the program branches to the command "increment learning content counter by 1". Subsequently, the next learning content is loaded from the learning material memory 6 into a preparation memory or buffer (not shown in FIG. 2) which is also implemented in the main memory of the computer. The repetition number associated with that learning content is ascertained from the learning card file described hereinafter and the repetition counter is set to 1. In the first running of the program, the spot counter which specifies how many spots were previously displayed on the display screen is also set to zero and the program therefore branches to the command "increment spot counter by 1". The learning content in the buffer is now displayed on the display screen. The present system time is stored in the variable "time of the last spot". If the repetition counter is less than the repetition number associated with the learning content, the repetition counter is incremented by 1 and the program is left. Otherwise, the learning content counter is incremented by 1 and the next learning content is fetched from the learning material memory into the buffer, in which case the associated repetition number is ascertained from the learning card file. Further, in this case, the repetition counter is set to 1 and, as the spot counter is now greater than zero, the program is left. On the next running of the program, the system time is again loaded. As the learning content counter is now greater than zero, the variable "time since the last spot" is ascertained and determined from the system time less the time of the last spot. If the time since the last spot is less than the spot spacing which is inputted by way of the graphic user interface of the control program, the program is left. Otherwise, the spot counter is incremented by 1, the learning content is played onto the display screen from the buffer and the variable "time of the last spot" is set to the system time. Depending on whether the repetition counter is less than the repetition number associated with the present learning content, the repetition counter is incremented by 1 and the program is left or the learning content counter is incremented by 1 and the next learning content is fetched from the learning material memory into the buffer, in which case the associated repetition number is ascertained, the repetition counter is set to 1 and the program is left.

The commands relating to time control do not apply in regard to time-sharing versions.

By way of the checking program module 9, it is possible to check whether the learning person has correctly received the learning contents. For that purpose, the learning contents stored in the learning material memory 6 are desirably characterised as being stored in various learning card file compartments or boxes. If the learning content which is called up by the checking program module is known, the learning content is further put into a learning card file compartment or box with a higher degree of knowledge, in which case the learning contents of the learning card file box with the highest degree of knowledge are no longer put onto the display screen by the learning content display module. In addition, a given repetition number can be linked to each learning card file box. This is the number indicating how often a given learning content is to be displayed on the display screen in succession (or at what average frequency).

Figure 4:
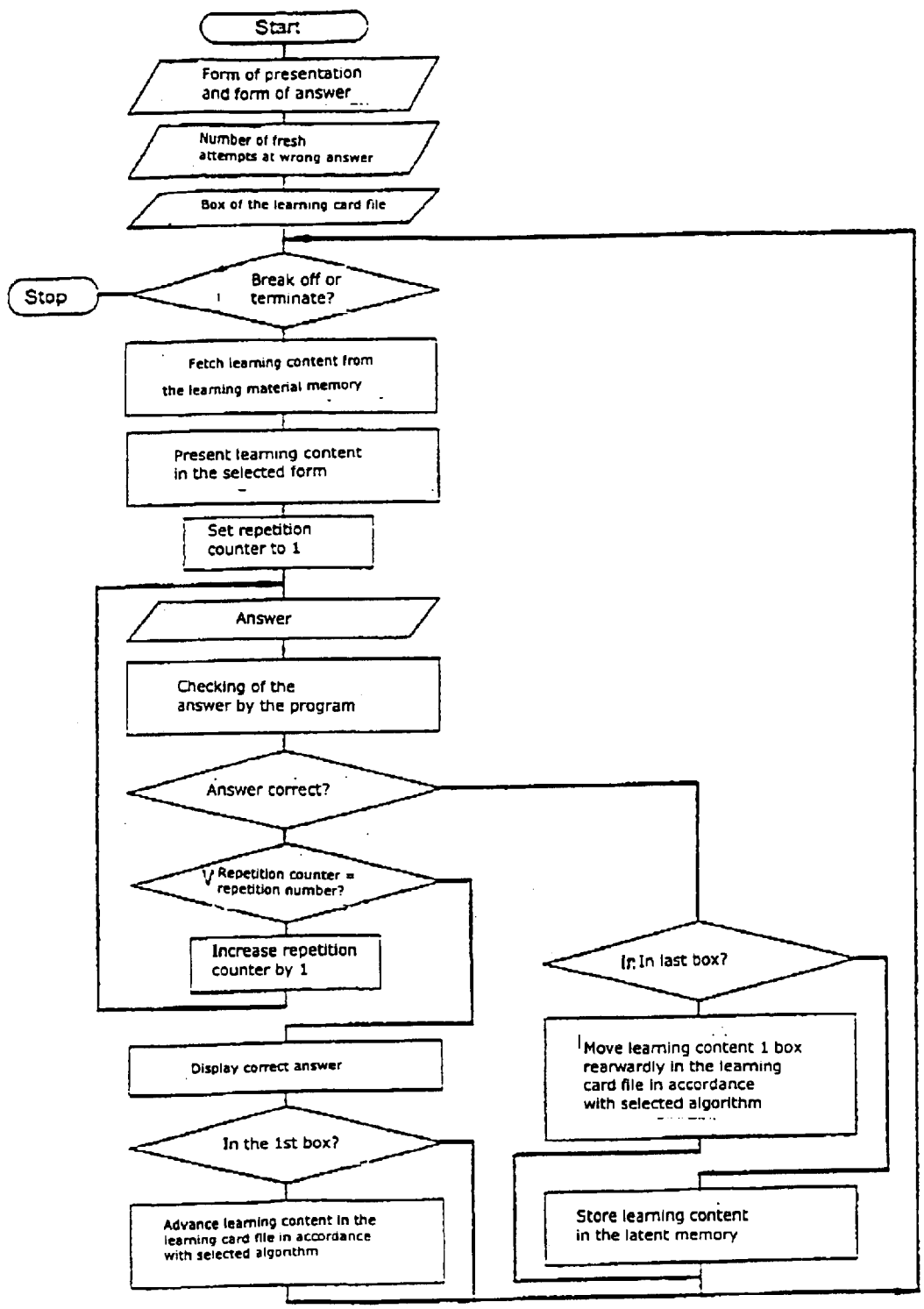
FIG. 4 shows a flow chart of the checking program module.

FIG. 4 shows a flow chart of the checking program module. After the start of the program, the form of presentation of the learning content and the form of the answer can be selected. In addition, the number of fresh attempts in the case of a wrong answer can be inputted. Finally, the learning card file compartment or box of the learning card file, which is to be checked, is also selected. If the program is not broken off or terminated, a learning content is fetched from the learning material memory and presented in the selected form on the display screen. The repetition counter is set to 1. After input of the answer, the answer is monitored by the program. If the answer is wrong, further progress of the program depends on whether the repetition counter corresponds to the repetition number. If that is not the case, the repetition counter is incremented by 1 and the answer can be inputted once again. If, on the other hand, the repetition counter is equal to the repetition number, the correct answer is displayed and, if the learning content is not already in the first compartment or box, the learning content is moved further forward in the learning card file by one or more compartments or boxes (the associated algorithm can be established by the user) and, if the program is not terminated, the next learning content is fetched from the learning material memory. If the answer was correct, the further procedure with the program depends on whether the learning content was already in the last active compartment or box. If that was the case, the learning content is stored in the latent memory which corresponds to the box with the highest degree of knowledge and from which no further introduction of the learning content into the computer game is implemented. Otherwise, the learning content is arranged in the learning card file backwards by one box, that is to say it is put into the box with the next higher degree of knowledge.

By way of the editor program module 10, it is possible for new learning contents to be inputted into the learning material memory or introduced from the data carrier in the hard disk drive 4 or the interchangeable data carrier drive 5 or for learning contents already present in the learning material memory to be processed. It also enables graphic configuring of the learning contents. The inputs can be checked for correctness by way of the input checking module 11.

Figure 5:
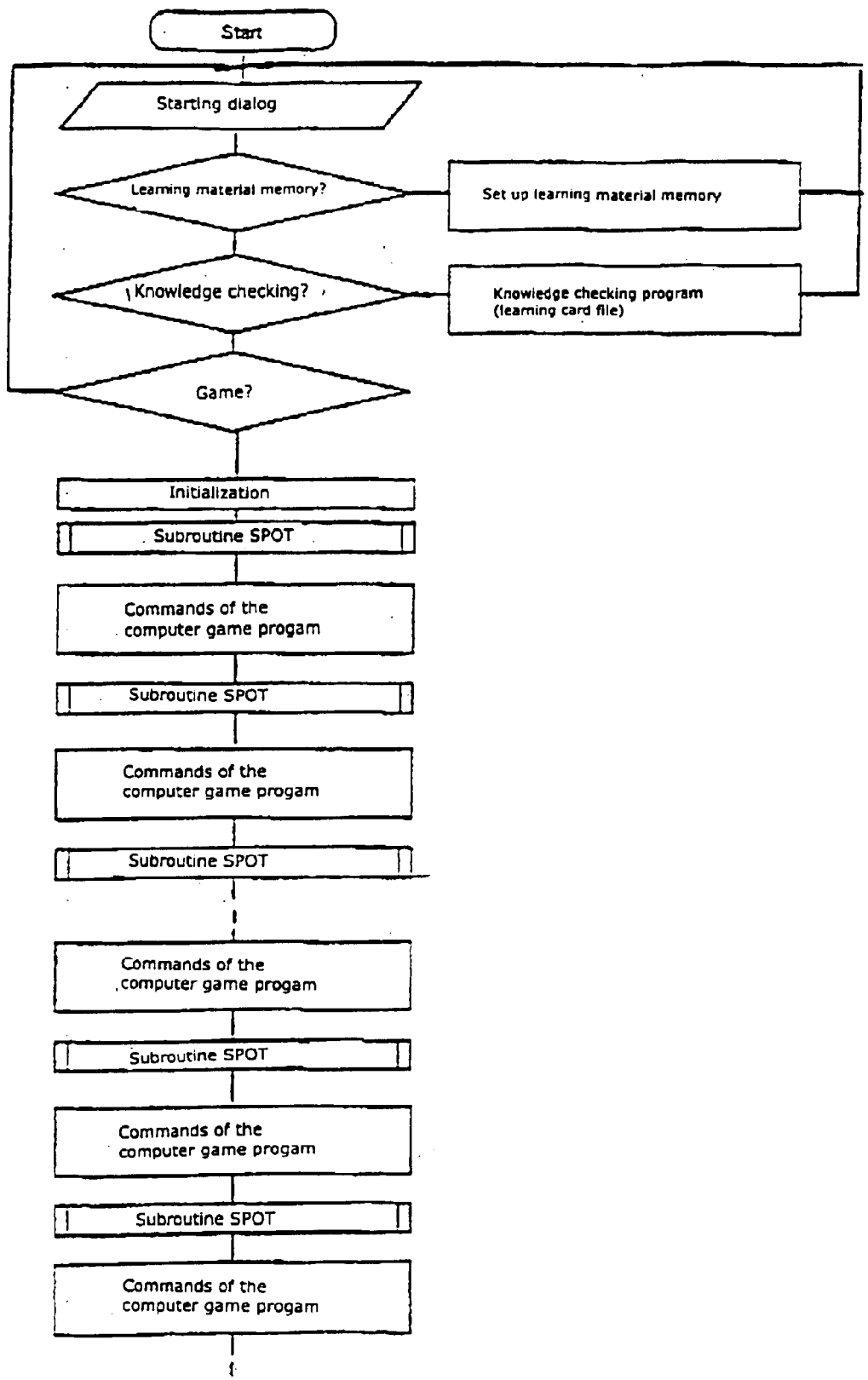
FIG. 5 shows a flow chart of another embodiment of a learning program with a learning program module which is interwoven with the computer game program module.

FIG. 5 shows a part of the flow chart of a further embodiment of the learning program. In this case, as set forth hereinafter, a learning content display module is interwoven with a computer game program. After a starting dialog in which, for example, the area of knowledge to be learned and the computer game to be used is interrogated, the procedure involves querying whether the learning contents in the learning material memory are to be processed and, if that is the case, the procedure returns to the starting dialog after processing of the learning material memory (by means of an editor program module). The procedure subsequently queries whether a knowledge checking operation is to be implemented. In that case, after implementation of the knowledge checking operation (with a checking program module), the procedure reverts to the starting dialog. Finally, the procedure queries whether the game is to be started and, in a negative case, it reverts to the starting dialog while in the positive case the game is initialized.

Subsequently, the program of the computer game runs and the command "go to the subroutine learning content display (=spot)" is distributed by way of the commands of the game program in such a way that this subroutine is called up at a spacing of approximately one second in each case. Another option would provide the subroutine learning content display to be called up by a time sharing command if the programming language of the computer game has such a command available.

Instead of a computer game, it would also be possible to play, on the display screen, other visual presentations such as, for example, a television film or a video game. Introduction of the learning contents as well as checking and editing of the learning contents can be effected in that case in a similar manner by way of suitable hardware. An apparatus for introducing a subliminal message into a normal television picture is known for example from WO 94/26063.

What is claimed is:

1. A learning system for displaying learning contents, said system comprising:

a device operable to cause a visual presentation to be displayed on a display screen;

a device operable to call up the learning contents to be learned from a learning material memory; and a device operable to introduce the learning contents at changing locations in a region of the visual presentation on the display screen such that each of the learning contents is introduced for a predetermined introduction period of time;

wherein the predetermined introduction period of time of each of the learning contents is less than 0.2 seconds; and wherein storage of the learning contents is effected in a plurality of learning card file compartments, wherein a known learning content is advanced into a learning card file compartment with a higher degree of knowledge, and wherein the learning contents of the learning card file compartment with the highest degree of knowledge are no longer introduced into the visual presentation on the display screen.

2. A learning system as claimed in claim 1, further comprising a device operable to interrupt the visual presentation during an introduction of a learning content.

3. A learning system as claimed in claim 1, further comprising a device operable to control said learning system based upon data inputted by an input device.

4. A learning system as claimed in claim 1, wherein learning contents are introduced at predetermined time intervals from each other, and wherein the predetermined introduction period of a each of the learning contents is shorter than a time interval between two successive introductions of learning contents.

5. A learning system as claimed in claim 4, wherein the time interval between the successive introductions of individual portions of learning contents is in a range of between 1 second and 10 seconds.

6. A learning system as claimed in claim 4, wherein the time interval between the learning contents can be set by a user.

7. A learning system as claimed in claim 1, wherein the learning content which is called up out of the learning material memory is provided to a buffer memory from which it is introduced at least one time into the visual presentation displayed on the display screen.

8. A learning system as claimed in claim 1, wherein a location of introduction contents follows the visual presentation on the display screen.

9. A learning system as claimed in claim 1, wherein the learning contents are introduced acoustically in a form of speech.

10. A learning system as claimed in claim 1, wherein contents of the learning contents stored in the learning material memory are variable.

11. A learning system as claimed in claim 10, wherein the contents of the learning contents stored in the learning material memory are variable by a person being subjected to learning.

12. A learning system as claimed in claim 1, wherein the visual presentation is one of a computer game, a television film, and a video game.

* * * * *